US009352536B2

(12) United States Patent
Niepelt et al.

(10) Patent No.: US 9,352,536 B2
(45) Date of Patent: May 31, 2016

(54) LABEL FILM

(75) Inventors: Ralf Niepelt, Gronau (DE); Sven Rudolph, Schkopau (DE); Herbert Bader, Nordwalde (DE); Karl-Heinz Konermann, Gronau (DE); Christian Kuckertz, Olpe (DE)

(73) Assignee: Mondi Gronau GmbH, Gronau (DE)

( * ) Notice: Subject to any disclaimer, the term of this patent is extended or adjusted under 35 U.S.C. 154(b) by 945 days.

(21) Appl. No.: 13/356,746

(22) Filed: Jan. 24, 2012

(65) Prior Publication Data
US 2012/0189830 A1 Jul. 26, 2012

(30) Foreign Application Priority Data

Jan. 25, 2011 (EP) ..................................... 11152117

(51) Int. Cl.
B32B 27/28 (2006.01)
B32B 7/02 (2006.01)
B32B 27/32 (2006.01)
(52) U.S. Cl.
CPC ......... *B32B 27/32* (2013.01); *Y10T 428/24975* (2015.01)
(58) Field of Classification Search
USPC ................................................ 428/220, 216
See application file for complete search history.

(56) References Cited

U.S. PATENT DOCUMENTS

| 2003/0148132 | A1 | 8/2003 | Schwinn |
| 2005/0136274 | A1* | 6/2005 | Hamulski et al. ............. 428/516 |
| 2010/0260989 | A1* | 10/2010 | Grefenstein et al. .......... 428/213 |
| 2011/0212338 | A1* | 9/2011 | Ambroise ..................... 428/516 |

FOREIGN PATENT DOCUMENTS

| DE | 198 59 789 | 6/2000 |
| EP | 1 543 955 | 6/2005 |
| WO | WO 2009/010079 | 1/2009 |

OTHER PUBLICATIONS

European Search Report dated Aug. 23, 2011 in European Patent Application No. EP 11 15 2117 with English translation of relevant parts.
ASTM D 1003 (11e1) ("Standard Test Method for Haze and Luminous Transmittance of Transparent Plastics"), Nov. 2011, pp. 1-7. (Spec., pp. 6 and 20).
DIN 67 530 (Jan. 1982), total of 11 pages. (Spec., pp. 6 and 10).

* cited by examiner

*Primary Examiner* — Tahseen N Khan
(74) *Attorney, Agent, or Firm* — Collard & Roe, P.C.

(57) ABSTRACT

A label film is formed by means of extrusion and has a layer that forms the surface, on a first side, composed of polyethylene with a proportion of at least 70 wt.-%, preferably at least 85 wt.-% high-density polyethylene, wherein the film thickness amounts to less than 75 μm. According to the invention, the 60° reflectometer value on at least the first side of the label film, determined according to DIN 67 530, is greater than 80, preferably greater than 90.

15 Claims, 1 Drawing Sheet

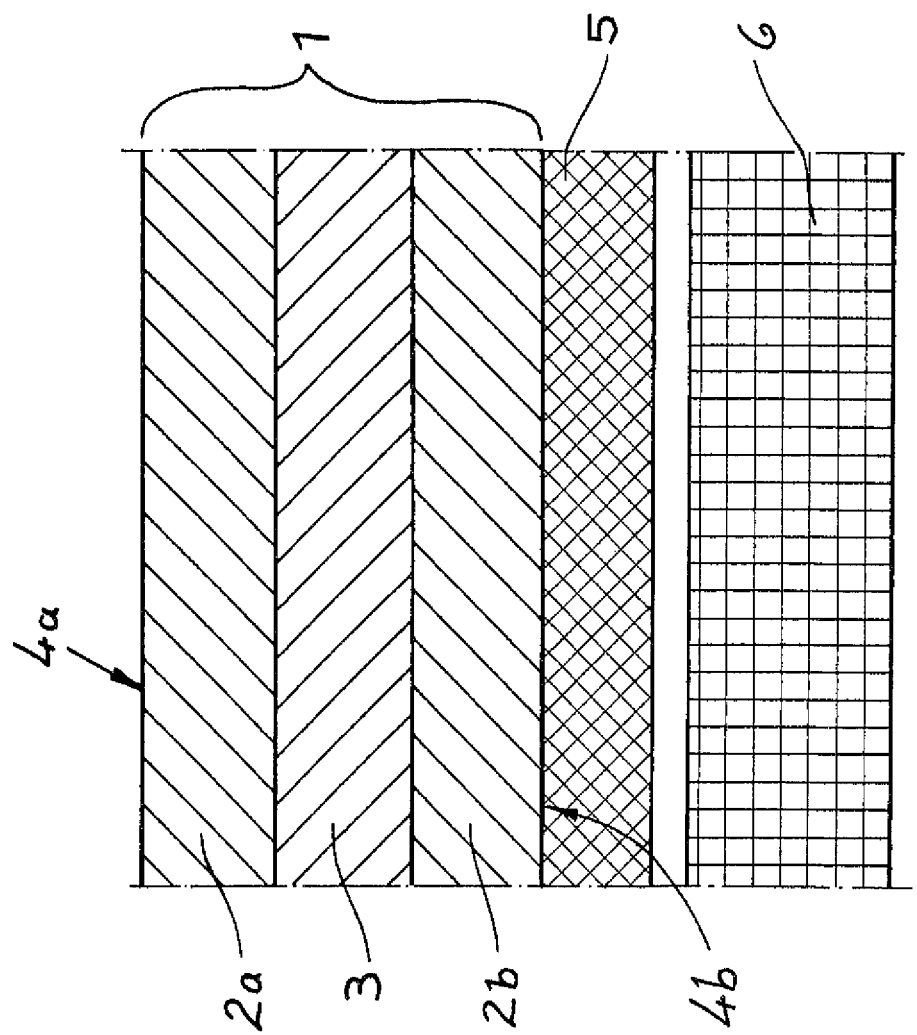

LABEL FILM

CROSS REFERENCE TO RELATED APPLICATIONS

Applicants claim priority under 35 U.S.C. §119 of European Application No. 11 152 117.5 filed Jan. 25, 2011, the disclosure of which is incorporated by reference.

BACKGROUND OF THE INVENTION

1. Field of the Invention

The invention relates to a label film that is formed by co-extrusion and has a layer that forms a surface on a first side, the layer being composed of polyethylene with a proportion of at least 70 wt.-%, and preferably at least 85 wt.-% high-density polyethylene, and the film thickness amounts to less than 75 μm. The invention particularly relates to multi-layer co-extruded films, whereby the layer that forms the surface on the first side represents a cover layer. In the case of a multi-layer configuration, at least two cover layers that lie on the outside, with a core layer disposed between them, are usually present.

2. The Prior Art

Label films are usually provided with an adhesive on one of their sides, and are kept available as a label film laminate, for the time being, together with a backing that covers the layer of adhesive. Labels are punched out of the material of the label film, so that these can be individually applied after the backing is pulled off.

The present invention particularly relates to a label film that is suitable for processing in a usual labeling apparatus, whereby separation of the label film from the backing takes place by angling it away and subsequently pulling-off the backing. For this purpose, the label film must demonstrate sufficient bending rigidity, whereby at the same time, for cost reasons, not only a low film thickness but also the use of the most cost-advantageous raw materials possible are aimed at. Furthermore, the label film must demonstrate good punching properties and must also be imprintable. Particularly in the case of higher-quality products, the label film must also have a high-quality appearance and must show an imprint to good advantage. Aside from sufficiently great bending resistance, great tear resistance and a tear propagation resistance that is balanced out in different directions/production directions and the transverse direction are aimed at, in order to achieve the greatest possible strength and good handling of labels that are formed from the label film.

Depending on the product provided with the label or the product packaging provided with the label, a matte or shiny surface can be advantageous. In many application cases, it is desired that the label itself is not visible or only barely visible, and the product is visible in the non-imprinted region, or, if applicable, the product packaging is visible, if this packaging is not itself transparent. Also, shiny surfaces as a whole are more popular than matte surfaces.

A label film having the characteristics described above is described in European Patent No. EP 1 543 955 B1. In the case of a label film consisting entirely of polyethylene, a reduction in the total thickness can be achieved by providing a core layer composed of a low-density polyethylene having a density of less than 0.945 g/cm$^3$ between two outer cover layers composed of a high-density polyethylene having a density of more than 0.945 g/cm$^3$, with the outer layers having a layer thickness of at least 15 μm. The embodiment described is based on the recognition that high-density polyethylene is more rigid as compared with low-density polyethylene, and the use of a rigid material in the outer zones has a greater influence on the bending rigidity of the label film. This is because when the film is bent, the outer sides are expanded or compressed more greatly, while the deformation about a central, neutral fiber is comparatively slight. The label film known from EP 1 543 955 B1 has good mechanical properties at a low total thickness. However, in practice, the optical properties known from conventional label films, particularly great shine and low cloudiness, cannot be achieved, so that the area of use of the label film described in EP 1 543 955 B1 is accordingly limited.

A label film having a reduced thickness is known from International Application No. WO 2009/010079 A1, which film is produced by co-extrusion. In the case of an arrangement having two cover layers, the core layer disposed between them has at least 50% polypropylene, thereby achieving sufficient bending rigidity at a thickness of less than 80 μm, in order to be able to process the label film in a usual labeling apparatus. Different polyethylene types and polymer mixtures with styrene-butadiene-styrene copolymer are proposed as cover layers. The embodiment of the core layer provided according to WO 2009/010079 A1, with at least 50% polypropylene, leads to the result that the entire label film cannot be punched as well, because of the increased strength of the polypropylene. In addition, there are also significant disadvantages with regard to the extrusion process, because on the basis of the higher melting point of polypropylene, a higher processing temperature and accordingly also a greater introduction of heat are required. In addition to the greater demand for energy on the basis of the increased melting and extrusion temperature, a longer cooling time in connection with extrusion must also be taken into consideration accordingly, and this has a negative effect particularly for blown film extrusion, in which the extruded film is at first present as a type of bubble. Finally, process management and the apparatus expenditure in the case of materials having different melting temperatures, such as PE and PP, are significantly increased. Another label film having outer layers composed of polyethylene and a core layer composed of polypropylene is known from German Patent No. DE 198 59 789 C1, whereby here, too, the disadvantages described above are present.

In practice, multi-layer label films are predominantly used, which have a thickness between 80 μm and 90 μm. The individual layers are each formed from a blend of low-density polyethylene (LDPE) and high-density polyethylene (HDPE). In this connection, the main component of the individual layers is LDPE, and HDPE is usually mixed in at a proportion of less than 30 wt.-%. The percentage proportion of HDPE varies as a function of the desired optical properties, and the shine and the transparency of the label film are improved by a reduced proportion of HDPE in the cover layers, as compared with the core layer. The standard label films described have good optical properties, easy punchability, good mechanical properties, as well as good imprintability. For cost reasons, such standard label films are generally produced as blown films.

SUMMARY OF THE INVENTION

It is therefore an object of the invention to provide a label film that is easy to produce and has a comparatively low film thickness, without impairing the mechanical properties or the optical appearance.

Proceeding from a label film having the characteristics described initially, the task is accomplished, according to the invention, in that the 60° reflectometer value on at least the first side of the label film, determined according to DIN 67 530 (1982), the disclosure of which is herein incorporated by reference, is greater than 65, preferably greater than 75, and particularly preferably greater than 85. The first side is exposed in the case of the labels formed from the label films and applied to an object, while the label is applied to the object to be identified on the opposite second side of the label film, preferably by means of an adhesive layer.

According to another aspect of the present invention, the cloudiness determined according to ASTM D 1003 (11e1) ("Standard Test Method for Haze and Luminous Transmittance of Transparent Plastics"), the disclosure of which is herein incorporated by reference, amounts to less than 30%, preferably less than 25%, particularly preferably less than 23%, proceeding from a label film produced by co-extrusion and having the characteristics described initially.

The layer that forms on the first side of the surface has great shine, for which purpose the corresponding layer is preferably formed from a high-density polyethylene produced with metallocene catalysts (mHDPE). Additionally or alternatively, the film in total has low cloudiness, and this can also be achieved by means of the use of mHDPE. The present invention is based on the recognition that the metallocene technology leads to a molecule structure that can be very well controlled and is uniform, so that in addition to a comparatively narrow and adjustable molar mass distribution, a variation in the type and length of the co-monomers installed during polymerization can be utilized to adjust desired product properties, particularly good optical properties. In this way, the use of suitable high-density polyethylene produced with metallocene catalysts makes it possible to adjust the reflectometer value to the parameters according to the invention. When using usual, conventional high-density polyethylenes, the optical properties are clearly not as good; in particular, the shine is much less. Furthermore, marked cloudiness can be perceived. The label films known from the state of the art, having cover layers composed of a high-density polyethylene, therefore do not meet greater quality demands.

A suitable high-density polyethylene (mHDPE) produced within the scope of the invention is, for example, LUMICENE® mHDPE M 5712 from TOTAL Petrochemicals. Preferably, the layer that forms on the first side of the surface consists entirely of high-density polyethylene, in other words particularly mHDPE. In the case of a multi-layer configuration, both cover layers can also consist of high-density polyethylene, in other words particularly mHDPE.

In the case of the label films known from practice, having an outer layer that has high-density polyethylene, significant formation of dust is observed, not only in production but also in further processing and imprinting of the label film. The dust not only leads to contamination of the machines used in the production and processing sector, but also significantly impairs the properties of the film. There is the danger that the surface of the film will be contaminated in such a manner that imprinting or corona treatment is not easily possible. Mechanical removal of the dust is usually not undertaken, because this could cause scratches that are not acceptable in the sector of label films. Usually, the dust is bound in a primer layer onto which imprinting takes place later.

If mHDPE is used, according to a preferred embodiment of the invention, the effect is surprisingly obtained that the formation of dust is very clearly reduced or even actually prevented. This surprising effect can be traced back to the fact that mHDPE has greater purity and accordingly fewer low-molecular components. Within the scope of the invention, it is possible to do without a primer, for multiple reasons. On the one hand, when using mHDPE, the problem with dust, as described above, does not exist. On the other hand, the label film already demonstrates very good optical properties and can also be imprinted comparatively well. Significant cost savings result from the elimination of a separate primer layer, because not only an additional processing step but also the costs for the primer itself are eliminated. Using the label film according to the invention, it is therefore possible to form labels that are imprinted directly, without a separate primer layer. However, provision of a primer layer continues to remain possible within the scope of the invention, if this is desired in an individual case.

If only great shine is desired, the label film can be colored with pigments, for example titanium dioxide as a white pigment, without restriction. However, an embodiment in which the label film is transparent is preferred, whereby then, low cloudiness of the label film is aimed at, so that it is invisible, to a great extent. Even slight cloudiness of less than 30%, preferably less than 25% has not been achieved in the state of the art, for label films having a cover layer composed of high-density polyethylene. A film thickness restricted to values of less than 75 μm, within the scope of the invention, also has an advantageous effect.

The label film must also demonstrate sufficient bending rigidity, as explained initially, in order to be able to be processed in conventional labeling apparatuses. It is advantageous, in this connection, that in the case of a multi-layer configuration of the cover layers, which make a greater contribution to the bending rigidity because of the geometry during bending, are more rigid than the material of the core layer. Thus, a film thickness between 62 μm and 71 μm is preferred, within the scope of the invention, on the one hand in order to meet the usual mechanical requirements, and on the other hand to keep the production costs as low as possible.

According to the invention, the label film has a 60° reflectometer value on at least its first side, determined according to DIN 67 530 (1982), of greater than 65, and preferably greater than 75. The invention therefore fundamentally comprises also extruded mono-films composed of a suitable material, as well as at least two-layer co-extruded label films, which can also have an asymmetrical structure.

According to a preferred embodiment of the invention, however, the label film is formed by co-extrusion, with cover layers composed of polyethylene lying on the outside and a core layer composed of polyethylene lying on the inside, whereby the two cover layers consist by at least 85 wt.-% of high-density polyethylene. Within the scope of such a preferred embodiment, one of the cover layers on the first side of the label film forms the corresponding surface.

Because not only the cover layers but also the core layer consist of polyethylene, great laminate strength between the layers is generally guaranteed, so that it is possible to do without additional adhesion-imparting layers. This then results in a simple three-layer structure, whereby the two cover layers can preferably also be configured the same way. More than three layers can be provided, for example, if the thickness of the cover layers on the outside, composed of a high-quality material, needs to be reduced for cost reasons. Thus, it is possible, for example, to provide an additional layer of a more cost-advantageous material underneath the cover layers composed of a high-quality material that decisively determines the optical properties.

The thickness of the two cover layers together amounts to preferably at least 50% of the entire film thickness.

In order to achieve a film thickness of less than 75 μm and preferably a film thickness between 62 μm and 71 μm, both the two cover layers and the core layer each have a thickness between 20 μm and 25 μm, according to a preferred embodiment of the invention, so that the thickness of the individual layers is approximately the same. A thickness ratio of 1:1:1 is preferably obtained. A thickness ratio of approximately 1:1:1 is present if the core layer has a thickness between 80% to 120% of the thickness of the cover layers.

The individual layers of the label film can contain additives and admixtures, in usual manner, which generally have a weight proportion of less than 15%, preferably less than 5%. Furthermore, the label film consists completely of polyethylene and can therefore also be produced and recycled particularly well. In particular, polyethylene in general has a comparatively low melting and processing temperature, so that the energy input required for production is relatively low. It is a further advantage that for all the polyethylenes that form the label film, fast cooling below the melting point takes place, so that problem-free co-extrusion is made possible. Thus, mHDPE is characterized by great melt stability in connection with extrusion, particularly blown film extrusion, whereby the bubble formed underneath the extrusion head during blown film extrusion is directly stabilized by means of rapid cooling below the melting point. The preferred thickness ratio of the layers of 1:1:1 also allows particularly simple process management, because approximately the same material flow can be adjusted for all the layers.

Within the scope of the invention, the core layer composed of polyethylene, which lies on the inside, has a density of less than 0.945 g/cm$^3$. A density between 0.925 g/cm$^3$ and 0.935 g/cm$^3$ is particularly preferred, whereby this value range lies at the borderline between low-density polyethylene and medium-density polyethylene, according to the usual classification. The distinction is not a sharp one, in practice, in this connection, whereby aside from the pure volume weight, the structure of the polymer chains is also taken into consideration in the classification. Thus, for example, polyethylenes having a density of more than 0.93 g/cm$^3$ are also referred to as LDPE (low-density polyethylene), if a molecule structure that is typical for low-density polyethylene is present. For the core layer, low-density or medium-density linear polyethylenes can also be used; these are referred to as LLDPE and LMDPE, respectively. Fundamentally, a polyethylene produced with metallocene catalysts, in other words an mLDPE or mMDPE, can also be used for the core layer. The mechanical properties can be further improved or adjusted to the desired extent by means of corresponding high-quality polymer types.

As compared with polypropylene, polyethylene, particularly also mHDPE, demonstrates clearly better imprintability. The label film according to the invention is imprinted on one side, whereby the imprint can be affixed either on the exposed first side or, in protected manner, on the second side, which is provided with adhesive. For practical reasons, however, imprinting frequently takes place only after formation of the label film laminate, in which the label film, with adhesive, is disposed on a backing. In such a case, the exposed first side is always imprinted. At least the side of the label film that is supposed to be provided with an imprint can be subjected to surface treatment, in order to improve the imprintability. This has the advantage that simple treatments such as corona discharge are already sufficient, while in the case of polymer types that cannot be imprinted as well, more complicated, more specialized techniques such as a so-called aldyne pretreatment are necessary, in which surface activation with groups that contain nitrogen takes place by plasma discharge. A metallization can also be applied at the surface of the label film. If the layer provided at the corresponding surface has a high proportion of mHDPE or consists entirely of mHDPE, there is the advantage that application of a metallization is simplified because of the improved surface quality and greater purity, whereby improved adhesion of the metallization is also achieved.

Good mechanical properties can also be achieved, in total, at a low film thickness, by means of the use of mHDPE in the cover layers. In this way, the bending rigidity, which is a decisive factor for application by machine, is clearly greater than in the case of known films having the same thickness, which have only low proportions of HDPE in the cover layers and otherwise consist of low-density polyethylene (LDPE) or medium-density polyethylene (MDPE). The film according to the invention has great tear resistance and tear propagation resistance, something that is of particular importance in practice. For example, during punching, the crosspieces and lattices formed around the individual labels during punching are frequently pulled off before any automated application of the labels. In order for this to take place as easily as possible, the crosspieces, which are interconnected in the form of a lattice, and some of which are very thin, are not supposed to tear even when the required tensile forces are applied, and significant tensile forces can occur not only in the production direction of the film (PD) but also transverse to it. Finally, in the case of the label films according to the invention, improved punching behavior is observed, which is attributable to an overall reduced dependence of the properties on direction, in other words smaller differences between the properties in the production direction of the film (PD) and transverse to that (TD).

In order to allow easy handling of the label film and, in particular, good removal of the lattice parts between individual punched-out films, the film should particularly demonstrate uniform expansion properties. At least according to a preferred embodiment of the invention, the elongation at break amounts to at least 400%, and preferably at least 500%, not only in the production direction PD but also in the transverse direction TD. If possible, a value of about 1000% should not be exceeded as the upper limit for elongation. This is because at an overly great value of elongation to break, a film that is tough, as a whole, is obtained, and under some circumstances, it can deform in an undesirable manner when tension is applied. The uniform expansion properties as described can be achieved by means of the use of mHDPE in the cover layer or a layer that forms a surface, which has been described above as being preferred. In contrast to this, simple types of HDPE have an extremely low elongation capacity in the transverse direction, of usually less than 100%.

As was explained initially, multi-layer label films are primarily used in practice; these have a thickness between 80 µm and 90 µm, and the individual layers are each formed from a blend of LDPE and HDPE. The main component of the individual layers is LDPE, with the proportion of HDPE usually lying below 30% and is further reduced in the cover layers, to improve the optical properties. Such label films represent a reference with regard to their mechanical and optical properties, because such label films not only demonstrate a high-quality appearance, but also can be handled particularly well. Important parameters in this connection are punchability, tear propagation resistance, and expandability of the film. Using the label film according to the invention, it is surprising that not only the optical properties but also the mechanical properties of the polyethylene film that is usually used can be achieved at a reduced total thickness, and material costs can be saved by means of the reduction in thickness. If mHDPE is provided in the cover layers according to a particularly preferred embodiment, somewhat higher raw material costs are more than offset by the material saving that is described.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The single FIGURE shows a label film laminate in a sectional representation.

DETAILED DESCRIPTION OF THE PREFERRED EMBODIMENT

The single FIGURE shows a label film laminate with a label film 1 that has cover layers 2a, 2b that lie on the outside and a core layer 3 that lies on the inside, composed of polyethylene having a density of less than 0.945 g/cm$^3$. On the first sides 4a formed by one of the cover layers 2a, an imprint is provided, which is preferably applied after a surface treatment by means of a corona discharge. On the opposite second side 4b of the label film 1, a layer of adhesive 5 is provided, which is protected by a removable backing 6.

Individual film labels can be punched out of the label film laminate shown. It is practical if the punching takes place in such a manner that only the cover layers 2a, 2b and the core layer 3 of the label film 1, but not the backing 6 disposed underneath them, are cut through. If the backing 6 is then pulled off to one side, separation of the layer of adhesive 5 takes place, because the label film 1 demonstrates great rigidity and thus cannot follow the angled movement of the backing 6. Application of individual labels can therefore take place in a conventional labeling apparatus.

The label film has a three-layer, symmetrical structure, and the two cover layers 2a, 2b are formed from a high-density polyethylene (mHDPE) produced with metallocene catalysts. For example, the polymer having the brand name Lumicene® M 5712 from TOTAL Petrochemicals is suitable. The core layer consists of a low-density or medium-density polyethylene.

The cover layers 2a, 2b and the core layer 3 each have approximately the same thickness of between 20 µm and 25 µm, so that a total film thickness of less than 80 µm, preferably between 62 µm and 71 µm, is obtained.

Accordingly, while only a few embodiments of the present invention have been shown and described, it is obvious that many changes and modifications may be made thereunto without departing from the spirit and scope of the invention.

What is claimed is:

1. A label film that is formed by means of extrusion and consisting entirely of polyethylene, except for additives and admixtures having a weight proportion of less than 15%, said label film having a layer formed on a surface on a first side, said layer being composed of polyethylene (mHDPE) produced with metallocene catalysts, with a proportion of at least 70 wt.-% high-density polyethylene, wherein the film thickness amounts to less than 75 µm, and wherein a 60° reflectometer value according to DIN 67 530 on at least the first side of the label film is greater than 85.

2. The label film according to claim 1, wherein the entire film thickness amounts to between 62 µm and 71 µm.

3. The label film according to claim 1, wherein the layer on the surface on the first side is pretreated by means of a corona discharge.

4. The label film according to claim 1, wherein the film is produced by means of blown film co-extrusion.

5. The label film according to claim 1, wherein a metallization is applied on one of the surface surfaces of the film.

6. The label film according to claim 1, wherein an elongation at break amounts to at least 400%, in a production direction and in a transverse direction.

7. The label film according to claim 1, wherein the label film is formed from polyethylene, by means of co-extrusion with cover layers composed of polyethylene that lie on the outside, wherein said layer on the first side forms one of the cover layers, and a core layer composed of polyethylene that lies on the inside, wherein the two cover layers each consist of at least 70 wt % high-density polyethylene.

8. The label film according to claim 7, wherein the cover layers consist entirely of high-density polyethylene.

9. The label film according to claim 7, wherein the cover layers are configured the same and border directly on the core layer.

10. The label film according to claim 7, wherein the thickness of the two cover layers together, amounts to at least 50% of the total film thickness.

11. The label film according to claim 7, wherein the cover layers and the core layer each have a thickness between 20 µm and 25 µm.

12. The label film according to claim 7, wherein the cover layers and the core layer have a thickness ratio of 1:1:1.

13. The label film according to claim 7, wherein the core layer that lies on the inside is formed from polyethylene having a density of less than 0.945 g/cm$^3$.

14. The label film according to claim 13, wherein the core layer that lies on the inside is formed from polyethylene having a density between 0.925 g/cm$^3$ and 0.935 g/cm$^3$.

15. A label film that is formed by means of extrusion and consisting entirely of polyethylene, except for additives and admixtures having a weight proportion of less than 15%, said label film having a layer formed on a surface on a first side, said layer being composed of polyethylene (mHDPE) produced with metallocene catalysts, with a proportion of at least 70 wt.-% high-density polyethylene, wherein the film thickness amounts to less than 75 µm, and wherein a cloudiness determined according to ASTM D 1003 amounts to less than 25%.

* * * * *